(12) United States Patent
Pellegri et al.

(10) Patent No.: US 6,475,661 B1
(45) Date of Patent: Nov. 5, 2002

(54) REDOX FLOW BATTERY SYSTEM AND CELL STACK

(75) Inventors: Alberto Pellegri, Germignaga (IT); Barry Michael Broman, Kirkland, WA (US)

(73) Assignee: Squirrel Holdings Ltd, George Town (KY)

( * ) Notice: Subject to any disclaimer, the term of this patent is extended or adjusted under 35 U.S.C. 154(b) by 0 days.

(21) Appl. No.: 09/463,624

(22) PCT Filed: Jan. 28, 1998

(86) PCT No.: PCT/IT98/00012
§ 371 (c)(1),
(2), (4) Date: Apr. 24, 2000

(87) PCT Pub. No.: WO99/39397
PCT Pub. Date: Aug. 5, 1999

(51) Int. Cl.[7] ........................... H01M 4/36; H01M 4/48; H01M 6/20; H01M 2/36
(52) U.S. Cl. .......................................... 429/105; 429/72
(58) Field of Search ................................... 429/105, 72

(56) References Cited

U.S. PATENT DOCUMENTS

| | | | |
|---|---|---|---|
| 4,786,567 A | * 11/1988 | Skyllas-Kazacos et al. | ... 429/19 |
| 5,496,659 A | * 3/1996 | Zito | ............................. 429/105 |
| 5,512,160 A | * 4/1996 | Lim | ............................. 205/61 |
| 5,804,329 A | * 9/1998 | Amendola | ................... 429/34 |

* cited by examiner

*Primary Examiner*—Stephen Kalafut
*Assistant Examiner*—Julian Mercado
(74) *Attorney, Agent, or Firm*—Connoll Bove Lodge & Hutz LLP; Larry J. Hume

(57) ABSTRACT

A redox flow battery composed of a plurality of cells in electrical series defined by a stacked and repetitive arrangement of a conductive intercell separator having a generally bipolar function, a positive electrode, an ion exchange membrane, a negative electrode and another conductive intercell separator, is operated by flowing a positive half-cell electrolyte containing reducible and oxidizable ions of a first redox couple through the compartments containing the positive electrodes and a negative half-cell electrolyte containing reducible and oxidizable ions of a second redox couple through the compartments containing the negative electrodes in cascade in a counter or equi-current mode. The difference of cell voltage between the first and the last cell of the stack is sensibly reduced and by-pass currents are substantially eliminated thus resulting in an increased overall faradic efficiency. A cell stack architecture provided with ducting for implementing the two counter current cascaded flows of the positive and negative electrolytes is described. The alternated used of cationic and anionic membranes compensate for unbalanced water transport through the membranes.

19 Claims, 8 Drawing Sheets

REDOX FLOW BATTERY SYSTEM AND CELL STACK

This invention relates in general to renewable electrochemical energy storage by redox flow battery systems and more in particular to vanadium redox secondary batteries.

Electrochemical systems because of their theoretically high efficiency have long been looked at as ideal energy conversion systems. In particular secondary batteries are by definition extremely interesting candidates for energy storage systems. Load levelling and peak-shaving in electric power generation, distribution and use are all areas where secondary batteries may offers very efficient solutions.

Among secondary batteries, the so-called redox flow battery or more briefly redox (cells) batteries employ solutions for storing the energy; the cell hardware simply providing an appropriate support for the parallel reduction and oxidation (redox) half-cell reactions, during both modes of operation, that is during the charging and the discharging processes.

The use of redox couples of the same (multivalent) element, that is for the a negative electrode redox couple as well as for the positive electrode redox couple, offers a great simplification in the handling and storage of the dissolved species.

The vanadium redox flow battery also referred to as the all-vanadium redox cell or simply the vanadium redox cell or battery, employs V(II)/(III) and V(IV)/(V) as the two redox couples, in the negative (sometime referred to as the anolyte) and positive (sometime referred to as the catholyte) half-cell electrolyte solutions, respectively.

Numerous publications on the all-vanadium redox cell have recently been published. Among these, the following provide an update overview of the secondary battery field, also including comparative cost analysis with alternative renewable energy storage systems, as well as among the most promising redox flow batteries that are being developed.

GB-A-2,030,349-A discloses a process and an accumulator for storing and releasing electrical energy based on a solid polymer electrolyte flow redox battery; Chromium-chromium redox couples and Vanadium-vanadium redox couples being indicated as viable choices.

U.S. Pat. No. 4,786,567, EP-A-0,517,217-A1, U.S. Pat. Nos. 5,250,158, 5,318,865, as well as the following articles:

"Improved PV System Performance Using Vanadium Batteries" by Robert L. Largent, Maria Skyllas-Kazacos and John Chieng, Proceedings IEEE, 23rd Photovoltaic Specialists Conference, Louisville, Ky., May 1993;

"Electrochemical Energy Storage and Vanadium Redox Battery" by Maria Skyllas-Kazacos, unpublished article freely distributed for general information purposes;

"The Vanadium Redox Battery for Efficient Energy Storage" by Maria Skyllas-Kazacos, unpublished article freely distributed for general information purposes; and "Status of the Vanadium Redox Battery Development Program" by C. Menictas, D. R. Hong, Z. H. Yan, J. Wilson, M. Kazacos and M. Skyllas-Kazacos, Proceedings Electrical Engineering Congress, Sydney, November 1994;

are all pertinent to the so called "Vanadium Redox System".

The publication WO 95/12219 describes methods for preparing stabilized solutions of vanadium and related redox systems.

EP-A-0,566,019-A1 describes a method for producing vanadium electrolytic solutions.

WO 95/17773 describes a combined system for producing electric energy in a biofuel cell, based on a vanadium redox flow system.

Typically and in general a redox flow battery systems includes two separate tanks, namely a catholyte tank and an anolyte tank and a plurality of cell stacks or batteries.

The capacity of the two tanks must be sufficient to provide for the required renewable energy storage capacity.

The overall cell area and the number of cells must be such as to satisfy the peak current and the "nominal" DC voltage requisites, respectively, thus dictating the electrical configuration (series and/or parallel) of the plurality of stacks or batteries.

The two hydraulic circuits of the catholyte and of the anolyte, respectively, is must be substantially separated from one another, each having its own circulation pump or pumps.

In a system employing single catholyte and anolyte tanks, that is functioning in a recirculation mode, the catholyte and the anolyte flow through the respective compartments of the unit cells of each stack or battery. Depending on whether the secondary battery is being discharged by flowing a current in an external electrical circuit that includes an electrical load, or being charged by forcing a current through the battery, both the catholyte and the anolyte are respectively discharged or charged.

Conventionally, a positive half-cell electrolyte solution (catholyte) is said to be charging when the redox couple therein is being oxidized more and more to the higher of the two valence states and to be discharging when the redox couple therein is being reduced more and more to the lower of the two valence states. Conversely, a negative half-cell electrolyte solution (anolyte) is said to be charging when the redox couple therein is being reduced more and more to the lower of the two valence states and to be discharging when its redox couple is being oxidized more and more to the higher of the two valence states.

As an alternative, instead of been operated in a recirculation mode, a redox flow system may be operated in a "batch mode".

According to this alternative mode of operation, both the negative half-cell electrolyte circuit and the positive half-cell electrolyte circuit include two tanks, respectively for the relatively spent or discharged solution and for the relatively charged solution. Pumps will be commanded to pump the positive half-cell electrolyte and the negative half-cell electrolyte from their respective spent electrolyte tanks to their respective charged electrolyte tanks during a charging phase of the battery and viceversa, when the battery is operated as an electrical energy source, to invert the direction of flow of the negative half-cell electrolyte and of the positive half-cell electrolyte streams so that the solutions be flown from the respective charged solution tanks to the respective spent solution tanks.

The batch mode of operation provide for a "volumetric" indication of the state of charge or of discharge of the system.

The stacks or batteries of individual cells comprise a plurality of cells in electrical series defined by a stacked repetitive arrangement of a conductive intercell separator having a generally bipolar function, a positive electrode, an ion exchange membrane, a negative electrode and another conductive intercell separator.

Each electrode is confined in a flow compartment, usually having an inlet manifolding space and an outlet manifolding space.

The actual voltage of each unitary redox flow cell during discharge when an electrical load is connected as well as the voltage that is needed to force a current through the cell during a charging phase, depends on the specific half-cell reactions (basically on the redox couple been used), however such a standard cell potential will be diminished during discharge and increased during charge by the energy losses associated with the internal resistance (R) of the cell, the overvoltage losses due to the finite kinetic of the half-cell reactions (activation overvoltage: $\eta_a$)) and the mass transport limitations (concentration overvoltage: $\eta_c$).

In practice, the actual voltage needed to charge the battery and the voltage delivered by the battery during discharge (charge), will be given in first approximation by the following equations:

$$E^o_{cell} = E^o_{cathode} - E^o_{anode} - iR - n_a - n_c$$

$$E^o_{cell} = E^o_{cathode} - E^o_{anode} + iR + n_a + n_c$$

While the terms $E^o_{cathode}$ and $E^o_{anode}$ representing the standard half-cell potentials will depend on the state of charge of the positive half-cell electrolyte and of the negative half-cell electrolyte besides temperature, the other terms reflect the kinetic limitations of the electrochemical reactions and the ohmic losses through the cell.

Redox flow batteries are customarily realized in the form of "bipolar" stacks that may include up to several hundred unit cells in electrical series. However, the largest is the number of unit cells that are stacked together the more critical becomes dimensional and planarity tolerances of construction and hydraulic sealing of such a large number of bipolar elements assembled together in a "filter-press" arrangement may become problematic.

Moreover, considering that the negative half-cell electrolyte and the positive half-cell electrolyte are circulated in parallel through all the respective flow compartments of the stack by conventionally constituting inlet and outlet manifolds by assembling together cell frames, electrodes, membranes and gaskets all provided with aligned holes, electric current by-pass along the body of electrolytes contained in these manifolds that extends along the entire length of the stack, become extremely critical in view of the large voltages involved.

By-pass current in the stack's manifolds may cause severe pitting corrosion phenomena on (half-cell) discharging surfaces and even where corrosion is not induced, they contribute to lower the overall faradic efficiency of the redox system.

Another typical behavior of redox flow battery systems, irrespectively of whether they are operated in a recirculation mode or in a batch mode, is represented by the fact that the standard cell potential is not relatively constant but varies significantly depending on the state of charge of both the negative half-cell electrolyte and the positive half-cell electrolyte. This standard cell potential variation during a peak-shaving or load-levelling application of the redox system creates nonnegligible problems of optimization of the electrical hardware of the renewable energy storage system. These problems normally require implementation of a microprocessor-based control and a remarkable complication of the inverters circuitry in order to compensate for the declining battery voltage during a discharge phase and for a cell voltage increase during a charge phase.

These problems are particularly relevant in all-vanadium redox batteries because of the relatively large variations of the standard half-cell potentials that are observed.

It has now been found and represents the object of the present invention, an improved method of operating a redox flow battery system that alleviates or completely eliminate the above-noted problems and drawbacks of the known systems.

Essentially, the method of the invention is based on flowing the negative half-cell electrolyte and the positive half-cell electrolyte through the respective compartments of a battery stack in cascade rather than in parallel as customarily implemented in prior art batteries.

It has been found that by circulating the negative half-cell electrolyte and the positive half-cell electrolyte solution in cascade or in sequence from the respective compartment of a first cell to the respective compartment of the next cell of the stack and so forth to the compartment of the last cell of the stack, by-pass currents in the stack may be almost completely eliminated. In practice only a negligible residual cell-to-cell by-pass path remains on which will insist the voltage of a single cell, irrespectively of the number of cells of the battery. Such a relatively small in consideration of the electrical resistance of the liquid body present in the hydraulically connecting conduit will produce a negligible residual level of by-pass current and will not cause any appreciable corrosion.

Furthermore, electric current path interruptions may be easily implemented outside the stack, most preferably at the respective tank inlet or even along the hydraulic circuit, between stacks. Electric path interruptions in the liquid "vein" constituted by the ducted stream of electrolyte may be implemented by employing a single or multilevel drip column. The system of the present invention permits to install such a current interruption device at the inlet of a storage tank and conveniently even inside the tank itself, in a top (non flooding) vent-portion thereof.

It has been found that any increased pumping requirement is more than compensated by the improved faradic efficiency of the electrochemical processes during charging and discharging phases.

Moreover, an appropriate design of the flow compartments of the cells can dramatically reduce the pumping requirements, that is the pressure drop along the cascade of compartments of a stack or of a plurality of stacks hydraulically fed in cascade, as will be illustrated later in this description.

The method of the invention is applicable irrespectively of the fact that the redox flow battery system be operated in a recirculation mode, employing only two distinct tanks, one for the negative half-cell electrolyte solution and the other for the positive half-cell electrolyte solution, or in a batch mode by employing two pairs of tanks, one pair for the positive half-cell electrolyte solution and the other pair for the negative half-cell electrolyte solution.

The two streams of negative half-cell electrolyte and positive half-cell electrolyte may be fed parallel into the respective flow compartments of a first cell of the stack (or of a first stack of a plurality of stacks in cascade) and flown in cascade up to the respective compartments of the last cell of the stack (or of the last of the stacks) to be eventually recycled to the respective tanks.

This mode will reproduce substantially the same half-cell conditions that are normally present in conventionally operated flow redox battery, whereby the voltage contribution of each cell of the stack (or of the plurality of stacks) electrically connected in series, will be determined, nominally, from the actual state of charge of the positive half-cell electrolyte and of the negative half-cell electrolyte solution present in the cell.

According to a preferred alternative embodiment of the method of operation of the invention, the negative half-cell electrolyte and positive half cell electrolyte streams are respectively fed into the respective compartment of a first cell, at one end and at the opposite end of the stack (or of the plurality of stacks connected in electrical series) of the cells in electrical series and therefore passed along the plurality of individual cells in electrical series in a "counter-current" mode.

In this way, conditions are established whereby the first cell at one end of the electrical series will function with a relatively charged negative half-cell io electrolyte or positive half-cell electrolyte and with a relatively discharged positive half-cell electrolyte or negative half-cell electrolyte and the last cell at the other end of the electrical series will be functioning with a reversed relative charge condition of the two electrolytes.

According to such an alternative embodiment, the method of the invention offers important and unsuspectable advantages.

A first advantage is represented by the fact that the method of circulation of the invention may be exploited to implement a self-averaging mechanism on a time-base (that is during the time taken by a given volume of negative half-cell electrolyte and of positive half-cell electrolyte to pass through the battery) of the nominal voltage produced (in a discharge phase) at the end terminals of a stack (or of a plurality of stacks connected in electrical series).

It has been found that by so counter balancing the relative state of charge of the positive half-cell electrolyte and or the negative half-cell electrolyte through the plurality of cells of a single stack or of the plurality of stacks connected in electrical series, the magnitude of variation of the nominal cell voltage that is mainly imputable to the progressive discharging or charging of the negative half-cell electrolyte and of the positive half-cell electrolyte solution may be substantially reduced, thus alleviating the problems of compensating for such a marked decline or rise of the cell voltage respectively during a discharge phase and during a charge phase.

In load-levelling and peak-shaving applications this timebase averaging mechanism of the battery voltage may be decisive in greatly simplifying the electrical circuitry design and management by simply reducing cell voltage excursions.

An additional important advantage of the circulation method of the invention, when implemented in a "counter current" mode, is a significant reduction of the phenomenon of water transfer unbalance through the ion exchange membranes that separate the respective negative half-cell electrolyte and positive half-cell electrolyte compartments of each individual cell.

As it is well known, redox flow battery systems are somewhat plagued by such a phenomenon that produces an increase of the volume of either the positive half-cell electrolyte or the negative half-cell electrolyte while proportionally decreasing the volume of the other. This phenomenon requires periodic re-equalization of the volumes of the negative half-cell electrolyte and of the positive half-cell electrolyte in their respective circuits.

In an all-vanadium redox flow battery system, a net water transfer from the positive half-cell electrolyte compartment to the negative half-cell electrolyte compartment is observed when the ion exchange separator is an anionic membrane while when a cationic membrane is used a reversed net water transfer from the negative half-cell electrolyte to the positive half-cell electrolyte is observed.

It is also accepted that the water transfer through the ion exchange membrane in the form of the hydration shells of the migrating ionic species is little significant as compared with the amount of water been transferred by osmosis.

The method of operation of the invention reduces the net water transfer through the membrane by reducing the concentration gradient across the membrane, during discharge and change phases.

According to a further aspect of this invention, the phenomenon of unbalanced water transfer may be practically eliminated by alternately installing a cation exchange (cationic) membrane and an anion exchange (anionic) membrane for separating the flow compartments of the single cells in every stack or battery or installing all cationic membranes in one stack and all anionic membranes in a second stack, and so forth. The opposite "direction" of the net unbalancing water transfer during the is cycling of the battery or batteries, as determined by the different kind of ion-selective cell separator installed, will decisively help to curb this undesired phenomenon to be practically negligible.

Moreover, the peculiar cascade circulation of the electrolytes, according to this invention, makes possible another yet utterly resolutive technique for completely overcoming the problem of unbalanced water transfer that otherwise would be impracticable in the operation modes of the prior art because of an unbearable accompanying loss of efficiency.

Under particular but recurrent conditions of operation, and precisely in systems operated in a batch mode and designed for a cycling of the batteries that includes a phase of substantially complete discharging of the negative half-cell electrolyte and positive half-cell electrolyte solutions after a similarly protracted phase of charging, as for example in a day-time exploitation of recoverable energy stored during the night, in a battery installation operated according to a cascade and counter current mode of circulation of this invention, the "spent" solution tanks for the negative half-cell electrolyte and the positive half-cell electrolyte may be unified in a single tank.

In practice, upon termination of any full discharge phase of operation, a volumetric equalization is practically implemented. During the charging process, the electrolyte recovered in the single tank is pumped into separate streams of negative half-cell electrolyte and positive half-cell electrolyte through the batteries to the respective tanks where the charged negative half-cell electrolyte and positive half-cell electrolyte solutions may be stored separately. In a battery installation of the prior art, implementing a parallel feed of the homopolar flow compartments of a battery or even in an installation implementing a cascaded flow through the homopolar compartments but in an equicurrent mode, unification of the two electrolytes, even if done with substantially discharged electrolytes, will determine a loss of efficiency that would remain prohibitive.

This can be easily recognized by considering for example that, in the case of an all vanadium battery, a completely discharged positive half-cell electrolyte will contain ideally all the vanadium as V(IV) because all the V(V) initially present in the charged solution can be reduced to just V(IV). Similarly, a completely discharged negative half-cell electrolyte will contain ideally all the vanadium as V(III) because all the V(II) initially present in the charged solution can be oxidized to just V(III).

If the two completely discharged electrolytes were to be mixed together, a solution containing about 50% of V(III) and 50% of V(IV) would be obtained. As a consequence, during the successive charging phase, a conspicuous amount of energy would have to be spent at the beginning in order to re-oxidize the 50% content of V(III) to V(IV) in the positive half-cell electrolyte, before starting to build up exploitable charge (to V(V)), and reduce back to V(III) the 50% content of V(IV), before starting to build up exploitable charge (to V(II)). In other words, mixing together the two spent electrolytes (with the objective of re-equalizing their circulating volumes) entails a major loss of charge (efficiency).

By contrast, operating in a counter current mode, that is with substantially "asymmetric" conditions, during a full discharge process, it is possible to "over-reduce" the vanadium in the positive half-cell electrolyte to become a mixture of V(IV) and V(III) and to "over-oxidize" the vanadium in the negative half-cell electrolyte to become a mixture of V(III) and V(IV). This is made possible because toward one end of the stack, the "over-reducing" solution of V(IV) and V(III) in a positive half-cell compartment of a cell will confront itself with a relatively charged solution still containing a large proportion of V(II) as compared with the content of V(III) in the negative half-cell compartment of the cell and similarly, toward the opposite end of the stack, the "over-oxidizing" solution of V(III) and V(IV) in a negative half-cell compartment will confront itself with a solution still containing a large proportion of V(V).

Therefore, when the two streams are unified in a single spent electrolyte tank, only a residual difference will exist between the two incoming streams and their mixing together will entail only a residually small loss of (charge) efficiency. Such a residually small loss of efficiency will be more than compensated by the automatic requalization of the two circulating volumes of electrolytes. In any case re-equalization of the unbalanced volumes, even if done periodically as in the known systems, inevitably causes a loss of charge much larger than in a system operated according to the above embodiment of the method of this invention.

Moreover, the above method has the attendant advantage of practically allowing for an energy storing capacity that can be as large as 50% in excess than that possible according to the prior art for the same amount of vanadium employed. Altogether, the investment per unit of energy of storage capacity will be substantially decreased.

These and other aspects and advantages of the invention will become even more evident through the following description of several important embodiments and by referring to the attached drawings, wherein.

Figure 5:
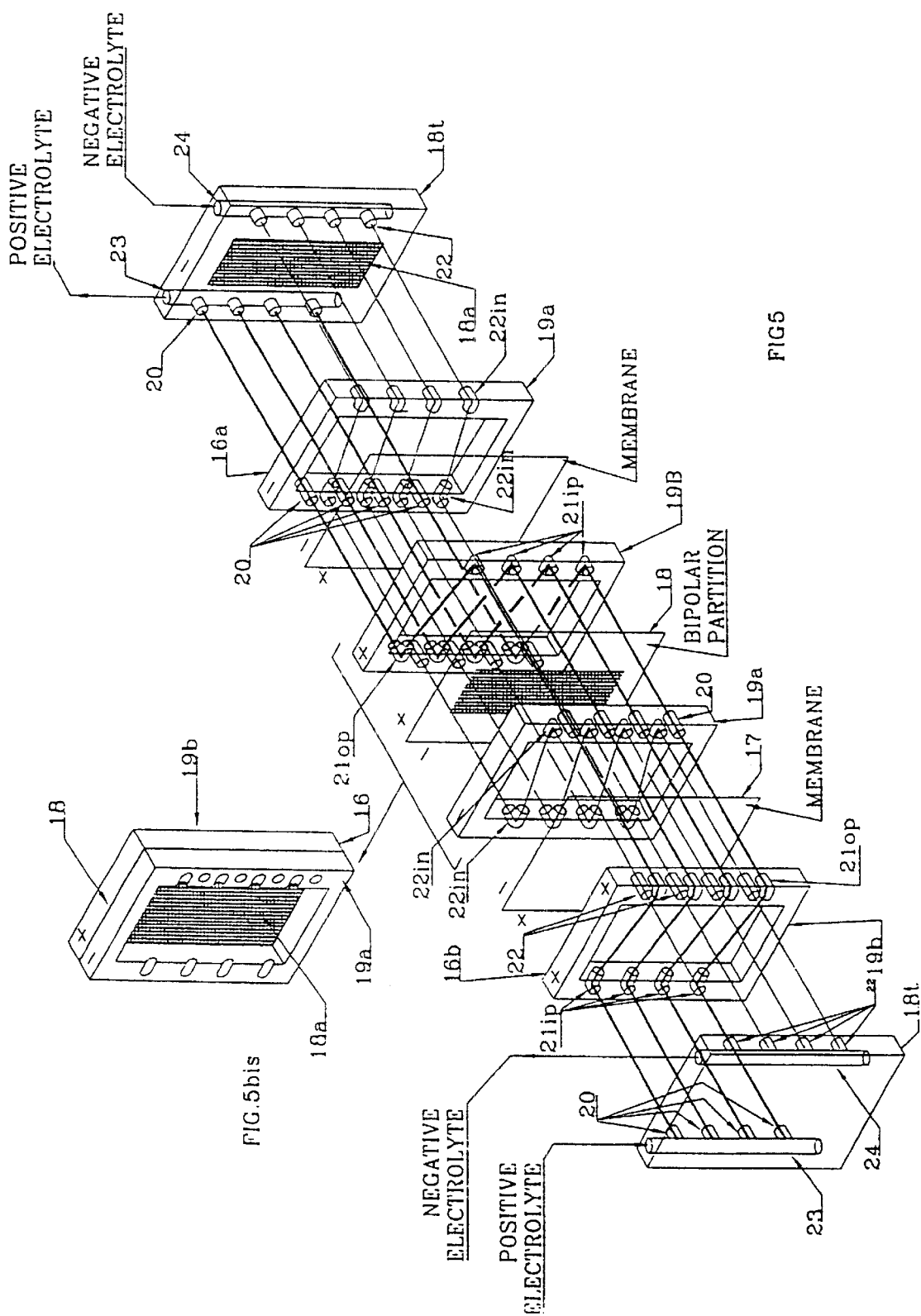
Figure 6:
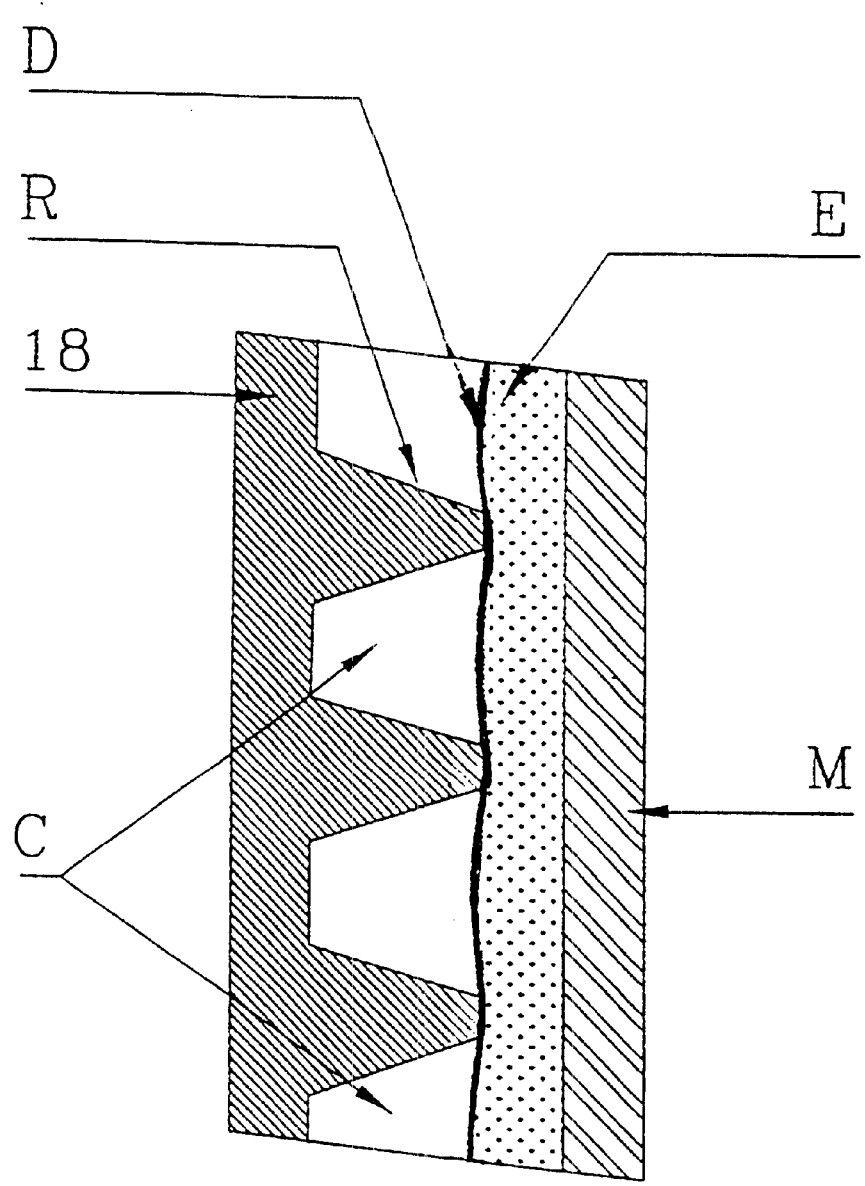
Figure 7:
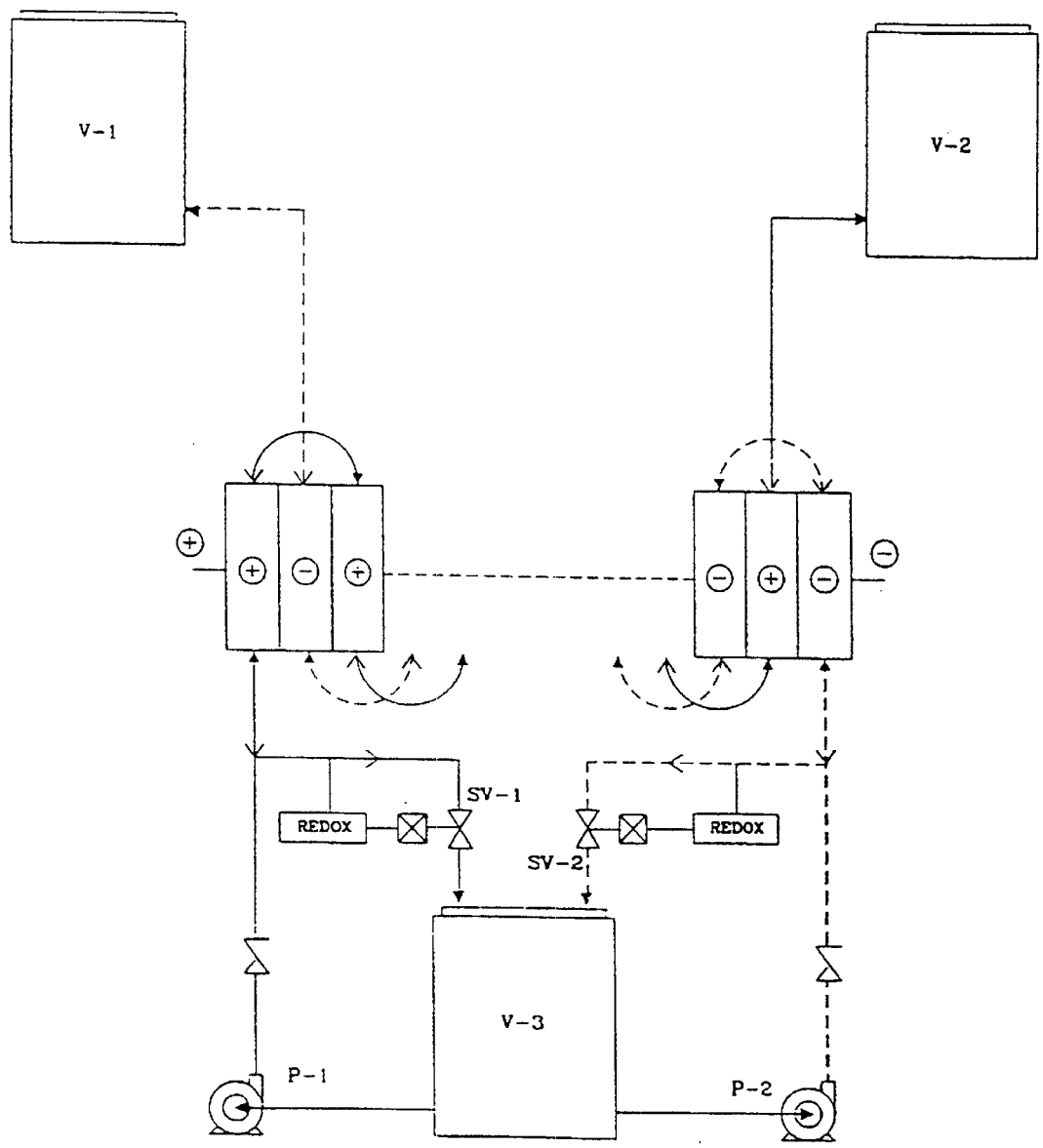
Figure 8:
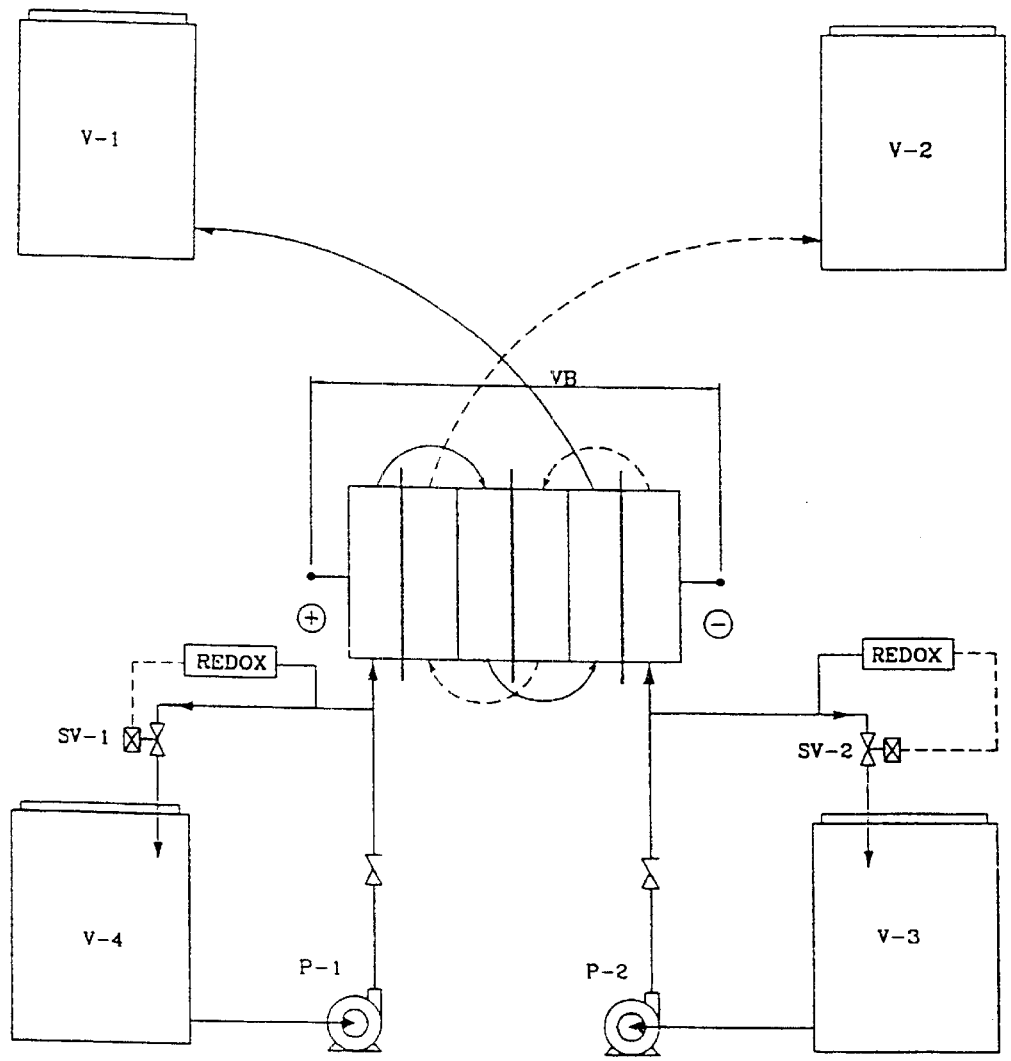
Figure 9:
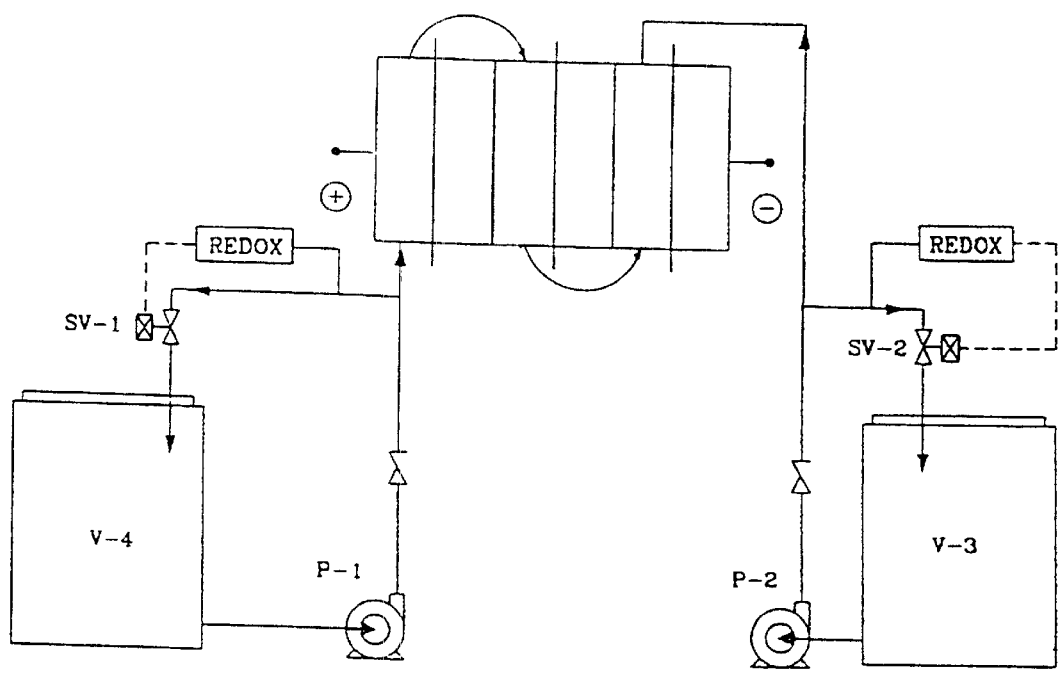
Figure 10:
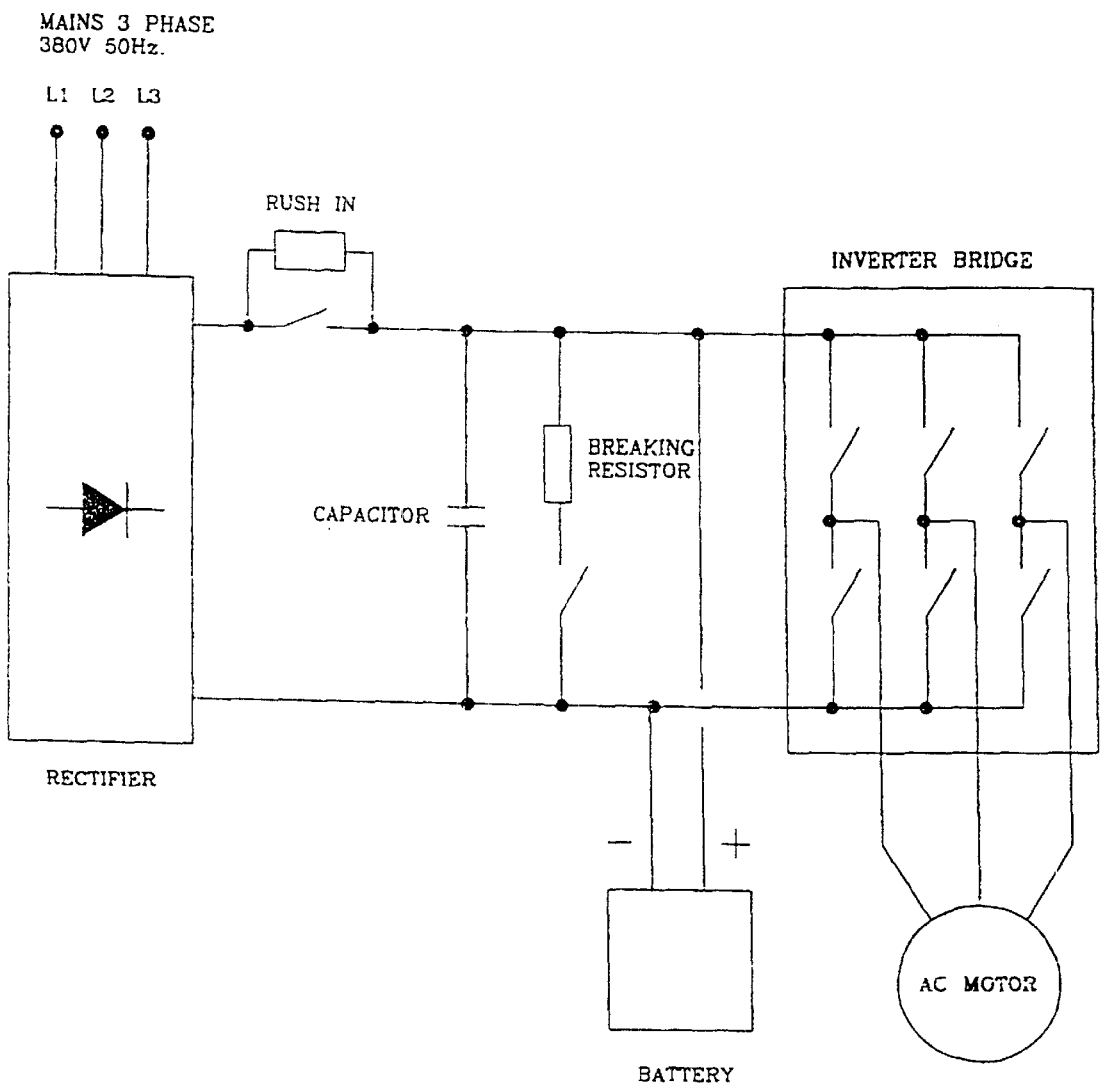

FIGS. 5 and 5 bis show a bipolar cell battery architecture implementing a hydraulic scheme of the invention according to an equicurrent mode of circulation of the two electrolytes;

FIG. 6 shows a low pressure drop architecture of the flow compartments of the individual cells;

FIG. 7 shows a scheme of positive half-cell electrolyte and negative half-cell electrolyte circuits with a countercurrent circulation through the battery and implementing a volumetric equalization at every cycle, according to an alternative embodiment;

FIG. 8 shows a peak-shaving energy storing plant according to an embodiment of the present invention;

FIG. 9 shows a peak-shaving energy storing plant according to an alternative embodiment;

FIG. 10 depicts an energy recovery electrical scheme for an elevator installation.

Figure 1:
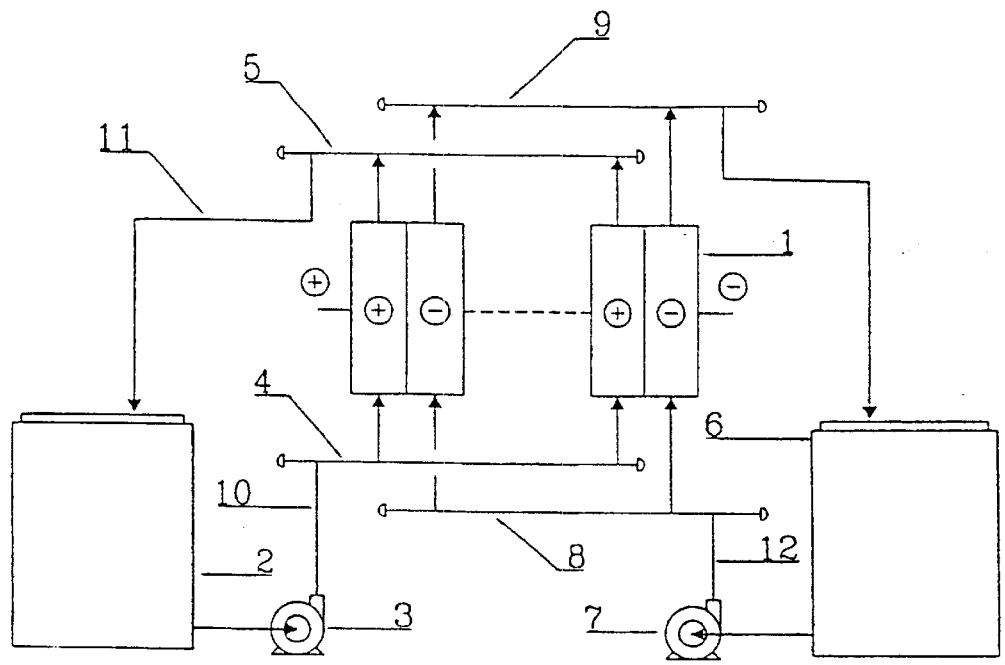
FIG. 1 shows the scheme of the negative half-cell electrolyte and positive half-cell electrolyte circuits of a redox flow battery plant operated in a recirculation mode, according to known techniques.

A typical redox flow battery system operated in a recirculation mode is schematically depicted in FIG. 1. Only a single stack 1 of a plurality of bipolar cells assembled in a filter press configuration is shown in the figure. Of course a large capacity installation may include a plurality of stacks or batteries electrically connected in series and/or in parallel.

The respective circuits of the positive half-cell electrolyte and of the negative half-cell electrolyte are schematically depicted in the figure. In the case of a recirculation mode of operation, as depicted, the positive half-cell electrolyte circuit includes a storage tank 2, a pump 3, a feed line 10, an inlet manifold 4 and an outlet manifold 5 for distributing the electrolyte in the respective positive half-cell flow compartments, indicated by the respective symbol in a circle, of each individual cell and a return line 11.

The negative half-cell electrolyte circuit is completely similar to that of the positive half-cell electrolyte and it includes the storage tank 6, the pump 7, the feed line 12, the distributing inlet manifold 8 and outlet manifold 9 and the return line 13.

The manifolds 4 and 5 may be external to the stack structure, or more customarily realized in the stack structure by aligned holes present in the various elements that compose the stack structure once sealingly assembled together in a filter press arrangement.

It is evident that between any two points in the liquid body of electrolyte contained in any one of the distribution manifolds 4, 5, 8 and 9, there will be a difference of potential, determined by the number of unit cells therebetween.

With an increasing number of stacked cells in electrical series, the attendant increase of voltage differences induces by-pass currents through the electrolyte contained in the distribution manifolds, from one electrode to another or more generally from any conductive surface to another conductive surface of the stacked cell battery structure.

The generally large voltages involved promote parasitic and almost invariably corroding half-cell reactions on these conductive surfaces or on the electrodes themselves, that often cause the evolution of unwanted gaseous products accompanied by pitting corrosions.

Of course these bypass currents detracts from the faradic efficiency of both the charging and the discharging processes.

Figure 2:
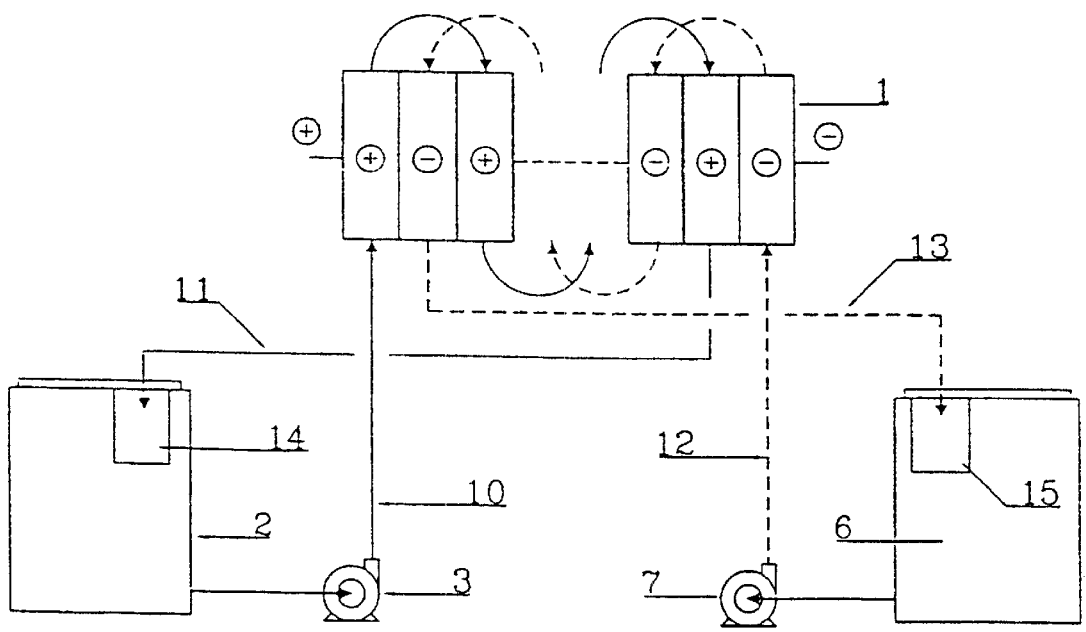
FIG. 2 shows the scheme of the positive half-cell electrolyte and negative half-cell electrolyte circuits of a plant similar to the one of FIG. 1, according to an embodiment of the present invention.

A functionally equivalent system to that of FIG. 1, but made according to a first embodiment of the present invention is depicted in FIG. 2, in which the same numbers have been retained for indicating equivalent parts.

Essentially, the homologous half-cell flow compartments of the plurality of unit cells that compose the stack 1 are fed with the respective positive or negative half-cell electrolyte in cascade.

As depicted in FIG. 2, the positive half-cell electrolyte is introduced in the respective positive half-cell compartment of a first cell, at one end of the stack, through the inlet line 10 and from this first flow compartment the electrolyte is thereafter fed in cascade through the positive half cell flow compartment of the following cell and so forth to the positive half-cell compartment of a last cell at the other end of the stack 1. From the positive half-cell compartment of the last cell, the electrolyte is then returned, through the line 11, to the respective recirculation tank 2.

Similarly, the negative half cell electrolyte may be fed, according to a first embodiment depicted in FIG. 2, to the negative half-cell flow compartment of a first cell of the stack 1, through the feed line 12, and after having been flown in succession through all the negative half-cell compartments of the cells, is returned to the respective storage tank 6 through the line 13.

According to the embodiment shown in FIG. 2, the streams of the positive half-cell electrolyte and negative half-cell electrolyte through the plurality of unit cells that compose the stack or battery 1, are conducted in a counter-current mode, as will be explained more in detail later in the description.

As can be recognized by comparing the schemes of FIG. 1 and FIG. 2, according to the system of the invention depicted in FIG. 2, by-pass currents may only occur along the entire recirculation circuit, essentially through the body of liquid contained in the feed-lines 10 and 12, in the respective return lines 11 and 13 and through the body of liquid contained in the respective storage tanks 2 and 6, provided an uninterrupted liquid "vein" exists.

This already signifies that in practice an intrinsic limitation to the level of any by-pass current will be ensured by the relatively long (highly resistive) paths, involving the whole length of the recirculation hydraulic circuits.

Even more significantly, the system of the invention lends itself to implement in a most effective and simple way interruptions of the by-pass current paths by allowing the installation of liquid "vein" interrupter devices, typically in the form of "drip columns", 14 and 15. These may include one or more flood-and-drip plates stacked one on top of the other and with a certain separation among each other. Preferably such a liquid vein interrupters 14 and 15 may be installed at the inlet of the respective electrolyte storage tank 2 and 6. Most preferably, drip columns or equivalent devices may be installed inside the respective tank, in the top (venting) portion thereof, so that the liquor may freely drip down in the pool of electrolyte contained in the tank.

The use of by-pass current path interrupters 14 and 15 will positively prevent any by-pass current. In any case the cascade circulation method of the invention greatly enhances the faradic efficiency of the electrochemical processes, during the charging and discharging processes of the battery.

Figure 3:
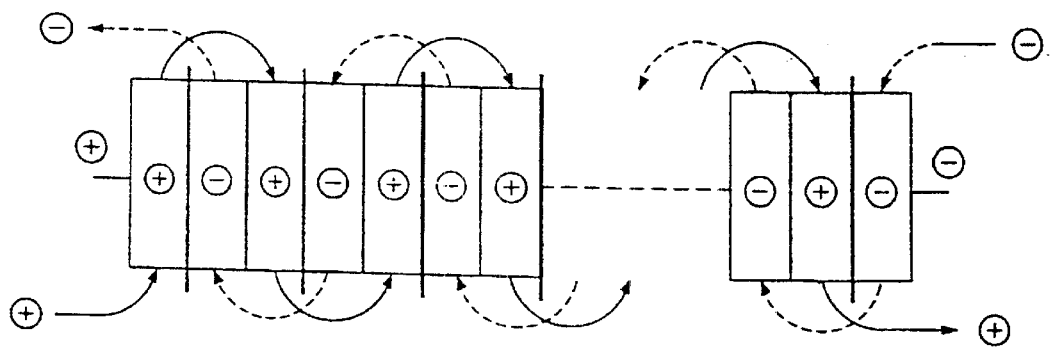
FIG. 3 is a partial scheme of electrolyte circulation in a countercurrent mode.
Figure 4:
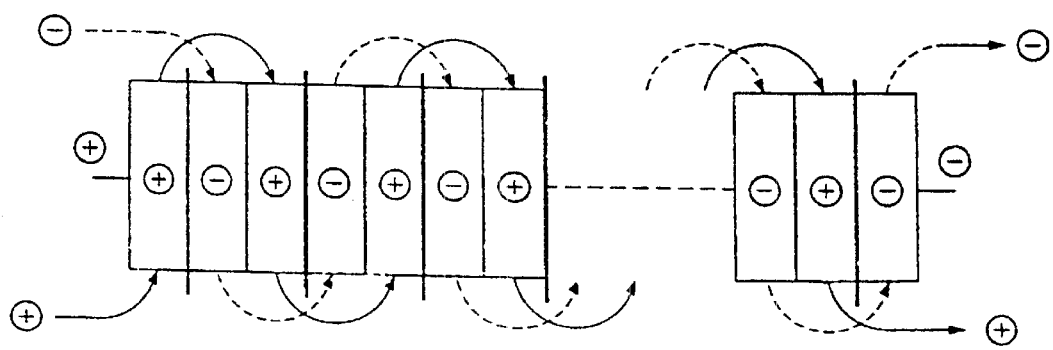
FIG. 4 is a partial scheme of electrolyte circulation in an equicurrent mode

FIGS. 3 and 4, schematically depicts the two alternative modes of operation according to the present invention.

The partial flow scheme of FIG. 3 emphasizes how the positive half-cell electrolyte and the negative half-cell electrolyte are cascadedly fed to the respective flow compartments of the plurality of stacked cells in a countercurrent mode.

As already mentioned above, according to this embodiment, a self-averaging of the battery voltage is obtained during both the charging phase and the discharging phase of the battery, that limits the overall voltage excursions during each phase of operation of the battery, thus easing the task of compensating for the variations of battery voltage.

Moreover, the concentration gradient existing across the ion-exchange membrane that separates the positive half-cell compartment from the negative halfell compartment of each cell of the battery is beneficially reduced under all conditions and this in turn reduces the net water transfer from one compartment to the opposite compartment. Therefore, also the problem of water accumulation in one of the two electrolyte circuits by an equivalent decrement of water content in the other circuit is attenuated.

According to the mode of operation depicted in FIG. 4, the two distinct streams of the positive half-cell electrolyte and negative half-cell electrolyte through the plurality of cells of the battery, may be conducted in equicurrent mode. In this way, apart from eliminating any by-pass current paths, electrochemical working conditions similar to those existing in the cells of a battery operated according to the prior art are substantially maintained in a battery operated according to the present invention.

A particularly effective stack architecture, implementing the cascade circulation modes of the positive half-cell electrolyte and negative half-cell electrolyte through the plurality of unit bipolar cells of a stack or battery 1, is schematically depicted in FIGS. 5 and 5bis.

According to this architecture, the succession of stacked bipolar cells is defined, apart from the two end sub-assemblies, 16*a* and 16*b*, respectively, by a plurality of bipolar sub-assemblies 16 disposed alternately with ion exchange membrane separators 17.

Each bipolar sub-assembly 16 includes a conductive bipolar intercell separator or partition 18, essentially impervious to the electrolytes. The conductive bipolar intercell separator 18 may be sealingly held in place (as depicted in FIG. 5) or be an integral part of and form together with a unique body frame bodies 19*a* and 19*b*. The intercell separator 18 and the frame (19*a*+19*b*) may all be of a suitably corrosion resistant metal, for example a passivatable (valve) metal or alloy or respectively made of an electrically conductive and of a preferably nonconductive moldable materials or even molded together in a single piece. Suitable conductive moldable materials may be resins loaded with conductive powders and/or fibers of a corrosion resistant material such as for example carbon, graphite, glassy carbon and valve metals.

The frames 19*a* and 19*b* have a sufficient thickness, to define flow compartments (of opposite polarity), belonging to two adjacent cells of the stack, separated by the conductive bipolar intercell partition plate 18, which is functionally disposed in a mid-position in relation to the overall thickness of the frame that would include the two semi-frames 19*a* and is 19*b*.

Electrodes of respective polarities are disposed in the respective flow compartments and are electrically connected in series, in a "back-to-back" configuration, through the conductive bipolar intercell separator 18. In the FIGS. 5 and 5bis only one of the electrodes, the negative electrode 18*a*, is visible; the positive electrode (18*b*) being present on the opposite (nonvisible) face.

Basically, along to opposite sides of the generally rectangular frames 19*a* and 19*b*, will be present two sets or orders of mutually interleaved through holes 20 and 22, respectively.

Each set of uniformly spaced holes (e.g. the set of holes 20), present alternately along one and the opposite side of the rectangular frames 19*a* of adjacent subassemblies 16 and 16*a*, are in fluid communication with the flow compartment of one polarity, in the example shown of the positive half-cell compartment, of adjacent sub-assemblies, through a first plurality of indentations, grooves or curved ports 21*ip*, present along a first or inlet side of the particular frame, that intercept the streams exiting the through holes 20, aligned therewith, of a preceding sub-assembly frame or terminal plate 19*t* and through a second plurality of similar indentations, grooves or curved ports 21*op*, present along the opposite or outlet side of the same frame, that intercept the through holes 20 of the next frame. Obviously, the location of these through holes 20 will be alternately on one side and on the opposite side of the rectangular frames in the succession of sub-assemblies that form the stack, while maintaining a precise axial alignment from end to end of the filter-press assembled stack. Of course the intervening ion-exchange membranes 17 that are functionally disposed between every two adjacent sub-assemblies 16, 16*a*, 16*b*, the bipolar portions 18, as well as any eventual gasket may be provided with a complete array of alignedly co-operating through holes in order not to interfere with the flow of the electrolytes from one compartment to the next of the same polarity, along the stack.

Suitable keying details or hanger-rod holes may be present in all the elements of the filter-assembly to facilitate a perfect alignment of the full array of holes and intercepting slots.

The cascade flow path through the plurality of negative half-cell compartments by the negative electrolyte is implemented in exactly the same manner, through the set of through holes 22 and the respective pluralities of intercepting indentations, grooves or curved ports 22in and 22on that are formed along opposite sides, respectively, of the frames 19a surrounding the negative half-cell compartments, the curved port holes 22on being spacingly interleaved with the other sets of through holes 20.

Practically, each of the monopolar sub-assemblies 16a and 18t and 16b and 18t that terminate the stack, at the two ends, respectively, may be provided as shown, with an inlet and an outlet or with two distinct inlet or outlet manifolds for feeding or recovering the respective electrolyte in the single compartment defined therein and for feeding or recovering the other of the two electrolytes from the opposite compartment of the adjacent bipolar sub-assembly, depending on whether a countercurrent or an equicurrent mode of circulation, according to the schemes of FIG. 3 and FIG. 4, respectively, be implemented.

As clearly recognizable from FIG. 5, the structure of the end elements 16a and 16b may be substantially similar to the structure of the equivalent elements of the bipolar sub-assemblies 16, with the peculiarity that the two electrolytes may be separately introduced or recovered through the respective manifolds 23 and 24 formed in the end (electrode) plates 18t that are intercepted by the through holes 20 and 22, respectively. A similar arrangement will be realized at the opposite end of the stack.

The provision of multiple parallel and uniformly spaced inlet and outlet vias in each flow compartment through sets of holes and grooves by interleaving them in the stack frames defines parallel streams of both electrolytes and this has been found to remarkably improve overall performance of the battery. Such an improved performance may be attributable to the highly improved mass transfer to the electrodes determined by the enhanced uniformity of electrolyte distribution to the reaction sites.

Depending on the electric load conditions and to attendant flow rate requirements, the relative tortuosity and length of each of the two distinct electrolyte circuits, according to the invention, the pumping requirements may increase significantly as compared with those of a conventional parallel-feed battery of the prior art.

Besides being such an increased pumping requirement substantially more than compensated by the elimination of by-pass currents in term of overall energy efficiency of the charging and discharging processes, the pumping requirements may be greatly reduced by adopting a relatively low pressure drop configuration of the flow compartments of the individual cells.

A preferred low pressure drop configuration is schematically depicted in FIG. 6.

Essentially the configuration is defined by arranging low pressure drop electrolyte flow channels C or spaces at the "back" of the respective active electrode structure E, which may advantageously placed directly in contact with the ion exchange separator M of the cell. The electrode structure E is typically a porous, substantially tridimensional layer which may or may not include a porous layer of electrodically active substance bonded onto the face of the ion exchange membrane M. More generally, the electrode layer E may include a compressible mat or felt F of carbon fibers providing for a sufficiently large active area. Essentially, the composite electrode layer includes a conductive mesh or cloth D to which the carbon fiber of the felt or mat F are electrically connected. This conductive mesh may be metallic to which a carbon fiber mat may be bonded by means of a conductive adhesive (for example a graphite or carbon powder loaded epoxy binder), or it may be a relatively heavy woven cloth of carbon fibers.

In any case, the conductive mesh or cloth D provides a secondary current distribution structure, that is contacted electrically by relatively spaced conductive ribs or protrusions R of the bipolar conductive intercell separator 18, which define low pressure drop electrolyte flow channels C at the back of the porous and composite electrode layer E.

Such a configuration permits to remarkably limit the pressure drop of the electrolyte pumped through the plurality of flow compartments in succession.

A particularly effective system for eliminating the quota of energy necessary for pumping the electrolytes during a discharging phase of the redox battery system of the invention, for a fullest exploitation of the stored energy during peak-demand periods or during emergencies by storing an equivalent quota of energy in the form of gravitational potential energy is depicted in FIG. 8.

According to this embodiment, during the charging of the redox battery system with low-cost recoverable electric energy during off-peak periods, the charged electrolytes are stored in respective tanks at a relatively is elevated level.

During re-utilization of the stored energy, the quota of energy normally necessary for pumping the two electrolytes in a reverse direction, from the respective charged electrolyte tanks through the battery and to the spent electrolyte recovery tanks, is eliminated by exploiting the gravitational potential energy for passing the electrolytes through the respective sequence of flow compartments of the cells of the battery.

A self-regulation system of the flow-rates may be implemented in a very simple manner either by monitoring the redox potential of the electrolytes outlet from the battery for providing a basic control information or, in alternative, by monitoring the battery voltage.

Either the battery voltage or the redox potential of the electrolytes may provide information on the state of charge of the positive and negative half-cell electrolytes exiting from the respective last cell of the battery and such an information can be usefully employed to drive electrovalves intercepting the flow of the solutions in their discharge lines. In this way the electrovalves will regulate the flow-rate of the electrolytes through the battery and eventually stop the flows according to load requirements.

An appropriate sensor of the relative redox potentials of the outlet electrolytes may be simply realized in the form of a miniature cell, structurally similar to the cells of the battery, through the compartments of which are passed the two streams of the electrolytes outlet from the respective last compartments of the battery. The open-circuit voltage of such a sensor cell will provide the required information.

Of course, a similar energy-saving control of the flow-rate of the positive half-cell electrolyte and negative half-cell electrolyte during a discharge phase of the system, may be implemented also in a system functioning in a normal recirculation mode, as depicted in FIG. 9, to adjust the flow-rate to the actual requirements of the load of the battery and eventually to stop the circulating pumps when the electrical energy is not been drawn from the battery system.

An energy storing system as the one depicted in FIGS. 8 or 9, represents an ideal solution to the implementation of an energy saving installation for elevators.

Elevators installations in office buildings as well as in condoflat dwellings have peculiar daily cycles. In an office building a large number of full-load cars will go up in the morning and a similar large number of full-load cars will go down in the evening, determining peak energy demands in the morning and peak energy generation opportunities in the evening. For a condo-flat dwelling the situation would be opposite.

Therefore, it becomes interesting to be able to store the energy generable during repeated full-car descents to be exploited during the peak energy demand periods when full-load cars are mainly moving upward.

Basically a system capable of storing energy when the elevator system is capable of generating electrical energy and to make available the stored energy when the elevator system become energy hungry, may be schematized as in FIG. 10.

By employing modem inverters, operating at a relatively high switching frequency generally comprised between 5 and 20 Khz, a battery capable of being charged at a voltage range generally comprised between 400 and 600 V, typically in the vicinity of 500 V would greatly simplifies the overall electrical system.

A battery system of the invention may indeed be designed with a practically unlimited number of cells in electrical series and, for an application as the one prospected above, the battery may include about 400 cells in electrical series.

The provision of fluid vein interrupters at the inlet of the charged electrolytes tanks or of the respective recirculation tanks, will ensure the absence of by-pass currents notwithstanding the large voltages involved. Moreover, the absence of internal by-pass current paths in the stack will permit to assemble together in a single filterpress assembly up to one hundred bipolar cells or even more.

What is claimed is:

1. A method of operating a redox flow battery comprising a plurality of cells in electrical series defined by a stacked and repetitive arrangement of a conductive intercell separator having a generally bipolar function, a positive electrode, an ion exchange membrane, a negative electrode and another conductive intercell separator, each electrode being confined in a flow compartment, comprising:

flowing a positive half-cell electrolyte containing reducible and oxidizable ions of a first redox couple through the compartments containing said positive electrodes and flowing a negative half-cell electrolyte containing reducible and oxidizable ions of a second redox couple through the compartments containing said negative electrodes, wherein each of said negative half-cell electrolyte and said positive half-cell electrolyte separately flow through respective compartments of said stack in cascade through the plurality of cells by introducing each electrolyte with a given state of charge into the respective compartment of a first cell, at one end of the stack, and recovering each electrolyte from the respective compartment of a last cell of the stack, at the other end thereof, in a modified state of charge depending on the level and direction of electric current passed through the battery during a transit time through a given volume of electrolyte.

2. The method of claim 1, wherein said electrolytes circulate though respective recirculation tanks.

3. The method of claim 1, wherein each of said electrolytes is flown from a respective charged electrolyte storing tank to a respective discharged electrolyte recovery tank during a discharge phase and in the opposite direction during a charge phase of operation.

4. The method of claim 3, wherein said respective charged electrolyte tanks are disposed at an elevated level above said plurality of cells, and said discharged electrolyte tanks are disposed at a lower level that the elevated level of said plurality of cells.

5. The method according to claim 1, wherein the respective streams of negative half-cell electrolyte and positive half-cell electrolyte in cascade through the plurality of cells of the stack are conducted in an equicurrent mode.

6. The method of claim 1, further comprising interrupting a liquid vein of each of two respective streams of electrolyte along their respective paths.

7. The method of claim 1, wherein the redox flow battery employs a V(III)/V(II) redox couple in the negative half-cell electrolyte and a V(V)/V(IV) redox couple in the positive half-cell electrolyte.

8. A method of operating a redox flow battery comprising a plurality of cells in electrical series defined by a stacked and repetitive arrangement of a conductive intercell separator having a generally bipolar function, a positive electrode, an ion exchange membrane, a negative electrode and another conductive intercell separator, each electrode being confined in a flow compartment, comprising:

flowing a positive half-cell electrolyte containing reducible and oxidizable ions of a first redox couple through the compartments containing said positive electrodes and flowing a negative half-cell electrolyte containing reducible and oxidizable ions of a second redox couple through the compartments containing said negative electrodes;

flowing said negative half-cell electrolyte and said positive half-cell electrolyte through respective compartments of said stack in cascade through the plurality of cells by introducing each electrolyte with a given state of charge into the respective compartment of a first cell, at one end of the stack, and recovering each electrolyte from the respective compartment of a last cell of the stack, at the other end thereof, in a modified state of charge depending on the level and direction of electric current passed through the battery during a transit time through a given volume of electrolyte, wherein respective streams of negative half-cell electrolyte and positive half-cell electrolyte flow in cascade through the plurality of cells of the stack are conducted in a countercurrent mode.

9. The method according to claim 8, wherein, in a discharge phase, the two streams of negative half-cell electrolyte and of positive half-cell electrolyte, respectively, outlet from the respective flow compartment of the respective last cell of the stack or of a plurality of stacks hydraulically fed in cascade, are recovered in a unified electrolyte tank and, in a charge phase, the spent electrolyte is flown from said unified tank in two separate streams, respectively of negative half-cell electrolyte and positive half-cell electrolyte, through the respective flow compartments of the cells of the stack or of the plurality of stacks and each stream, outlet from the respective flow compartment of the respective last cell, is collected separately in a respective charged electrolyte tank.

10. The method of claim 9, wherein said respective charged electrolyte tank is disposed at an elevated level above said plurality of cells, and said unified electrolyte tank is disposed at a level lower than the elevated level of said plurality of cells.

11. A redox flow battery plant, comprising:
a plurality of stacked cells in electrical series defined by a stacked and repetitive arrangement of a conductive intercell separator having a generally bipolar function;
a positive electrode;
an ion exchange membrane;
a negative electrode;
another conductive intercell separator,
wherein each electrode is confined in a flow compartment;
at least a storage tank for a positive half-cell electrolyte;
at least a storage tank for a negative half-cell electrolyte;
negative half-cell electrolyte ducting and pumping means for flowing said negative half-cell electrolyte solution through respective flow compartments of said cells; and
positive half-cell electrolyte ducting and pumping means for flowing said positive half-cell electrolyte solution through respective flow compartments of said cells,
wherein said negative half-cell electrolyte and said positive half-cell electrolyte ducting include means for flowing said positive half-cell electrolyte solution and said negative half-cell electrolyte solution in cascade from a respective flow compartment of a first cell of said plurality of stacked cells, to the respective flow compartment of a last cell of said plurality of stacked cells.

12. The redox flow battery system of claim 11, further comprising:
a first charged negative half-cell electrolyte storing tank;
a second spent negative half-cell electrolyte recovery tank;
a third charged positive half-cell electrolyte storing tank; and
a fourth spent positive half-cell electrolyte recovery tank;
said negative half-cell electrolyte and said positive half-cell electrolyte being flown from their respective charged electrolyte storage tanks to their respective spent electrolyte recovery tanks during a discharge phase of the battery, and from said respective spent electrolyte recovery tanks to said respective charged electrolyte storing tanks during a charging phase of the battery.

13. The redox flow battery system of claim 12, wherein said respective charged electrolyte storage tanks are disposed at an elevated level above said cells, and said spent electrolyte recovery tanks are disposed at a level lower than the level of said cells.

14. The redox flow battery system of claim 11, wherein said ducting means comprise at least a liquid vein interrupter along a flow path of each of said positive and negative half-cell electrolytes.

15. The redox flow battery system of claim 14, wherein each of said at least a liquid interrupter is in a form of a flood-and-drip column installed at an inlet of an electrolyte tank.

16. The redox flow battery system of claim 11, wherein the ion exchange membranes of said plurality of stacked cells are alternately cationic and anionic.

17. The redox flow battery system according to claim 16, wherein a type of ion exchange membrane alternates from a cell to a next cell.

18. (Amended) The redox flow battery system according to claim 16, wherein a type of ion exchange membrane alternates from a stack of cells to a next stack of cells.

19. A redox flow battery plant, comprising:
a plurality of stacked cells in electrical series defined by a stacked and repetitive arrangement of a conductive intercell separator having a generally bipolar function;
a positive electrode;
an ion exchange membrane;
a negative electrode;
another conductive intercell separator,
wherein each electrode is confined in a flow compartment;
at least a storage tank for a positive half-cell electrolyte;
at least a storage tank for a negative half-cell electrolyte;
negative half-cell electrolyte ducting and pumping means for flowing said negative half-cell electrolyte solution through respective flow compartments of said cells;
positive half-cell electrolyte ducting and pumping means for flowing said positive half-cell electrolyte solution through respective flow compartments of said cells,
a first charged negative half-cell electrolyte storing tank;
a second spent negative half-cell electrolyte recovery tank;
a third charged positive half-cell electrolyte storing tank; and
a fourth spent positive half-cell electrolyte recovery tank;
wherein said negative half-cell electrolyte and said positive half-cell electrolyte ducting include means for flowing said positive half-cell electrolyte solution and said negative half-cell electrolyte solution in cascade from a respective flow compartment of a first cell of said plurality of stacked cells, to the respective flow compartment of a last cell of said plurality of stacked cells,
said negative half-cell electrolyte and said positive half-cell electrolyte being flown from their respective charged electrolyte storage tanks to their respective spent electrolyte recovery tanks during a discharge phase of the battery, and from said respective spent electrolyte recovery tanks to said respective charged electrolyte storing tanks during a charging phase of the battery,
wherein said spent electrolyte recovery tanks are unified in a single recovery tank where said spent negative half-cell and positive half-cell electrolytes, circulated through the respective compartments of said plurality of stacked cells in a counter current mode, are mixed together.

* * * * *